(12) United States Patent
Houck et al.

(10) Patent No.: US 7,792,766 B2
(45) Date of Patent: Sep. 7, 2010

(54) DESIGN OF RECONNAISSANCE SURVEYS USING CONTROLLED SOURCE ELECTROMAGNETIC FIELDS VIA PROBABILISTIC NEURAL NETWORK

(75) Inventors: Richard T. Houck, Houston, TX (US); Dmitriy Pavlov, The Woodlands, TX (US)

(73) Assignee: ExxonMobil Upstream Research Co., Houston, TX (US)

( * ) Notice: Subject to any disclaimer, the term of this patent is extended or adjusted under 35 U.S.C. 154(b) by 497 days.

(21) Appl. No.: 11/886,171

(22) PCT Filed: Mar. 20, 2006

(86) PCT No.: PCT/US2006/009931

§ 371 (c)(1),
(2), (4) Date: Sep. 10, 2007

(87) PCT Pub. No.: WO2006/115622

PCT Pub. Date: Nov. 2, 2006

(65) Prior Publication Data

US 2008/0189228 A1 Aug. 7, 2008

Related U.S. Application Data

(60) Provisional application No. 60/675,045, filed on Apr. 26, 2005.

(51) Int. Cl.
*G06F 19/00* (2006.01)
*G06F 17/00* (2006.01)
*G06G 7/48* (2006.01)
*H04H 9/00* (2006.01)

(52) U.S. Cl. .............................. 706/12; 703/10; 702/1; 702/2; 702/6; 702/11; 367/73; 367/86

(58) Field of Classification Search .................. 703/10; 702/1, 2, 6, 11; 367/73, 86; 706/12
See application file for complete search history.

(56) References Cited

U.S. PATENT DOCUMENTS

| 5,646,342 A | 7/1997 | Hagenes et al. ........... 73/152.02 |
| 6,035,255 A | 3/2000 | Murphy et al. ................. 702/11 |
| 6,480,790 B1 | 11/2002 | Calvert et al. ................. 702/14 |
| 6,965,849 B1 * | 11/2005 | Cao et al. ..................... 703/10 |
| 2007/0255499 A1 * | 11/2007 | Strack et al. .................. 702/11 |

FOREIGN PATENT DOCUMENTS

| WO | WO01/33481 | 3/2001 |
| WO | WO2006/135568 | 12/2006 |

OTHER PUBLICATIONS

Cannon, R. L. et al. (1989) "An Expert System as a Component of an Integrated System for Oil Exploration," *Energy and Information Technologies in the Southeast*, Columbia, Proc. S.E. Conf. New York, 1, Apr. 9, 1989, pp. 32-35.

(Continued)

*Primary Examiner*—Donald Sparks
*Assistant Examiner*—Ola Olude Afolabi (57) ABSTRACT

Method for determining an expected value for a proposed reconnaissance electromagnetic (or any other type of geophysical) survey using a user-controlled source. The method requires only available geologic and economic information about the survey region. A series of calibration surveys are simulated with an assortment of resistive targets consistent with the known information. The calibration surveys are used to train pattern recognition software to assess the economic potential from anomalous resistivity maps. The calibrated classifier is then used on further simulated surveys of the area to generate probabilities that can be used in Value of Information theory to predict an expected value of a survey of the same design as the simulated surveys. The calibrated classifier technique can also be used to interpret actual CSEM survey results for economic potential.

16 Claims, 10 Drawing Sheets

OTHER PUBLICATIONS

Coopersmith, E. M. et al. (2002) "A Practical Approach to Evaluating The Value of Information and Real Option Decisions in The Upstream Petroleum Industry," SPE Paper 77582, 10 pages.

Curtis, A. (2004) "Theory of Model-Based Geophysical Survey and Experimental Design," *The Leading Edge*, Nov. 2004, 23.10, pp. 1112-1117.

Dyer, J. S. et al. (1990) "A Decision Support System for Prioritizing Oil and Gas Exploration Activities," *Operations Research*, 38.3, May-Jun. 1990, pp. 386-396.

Eaton, P. et al. (2002) "NEWTEM—A Novel Time-Domain Helicopter Electromagnetic System For Resistivity Mapping," *72nd Ann. Internat. Mtg: Soc. of Expl. Geophys.*, 1-4.

Kong, F. N. et al. (2002) "Seabed Logging: A Possible Direct Hydrocarbon Indicator for Deepsea Prospects Using EM Energy," *Oil and Gas Journal*, May 13, 2002, pp. 30-38.

Maurer, H. R. et al., (1998) "Optimized and Robust Experimental Design: A Non-Linear Application to EM Sounding," *Geoph. J. Int.*, 132, pp. 458-468.

Maurer, H. R. et al. (1998) "Geophysical Survey Design: Get The Most For The Least!," *68th Ann. Internat. Mtg: Soc. Of Expl. Geophys.*, pp. 78-81.

Newendorp, P. D. (1975) "Decisions to Purchase Imperfect Information," *Decision Analysis for Petroleum Exploration*, PennWell Pub., Chapter 10, pp. 501-536.

Singh, N. et al. (2002) "Effective Skin Depth With a Local Source And Its Application To Survey Design And Data Interpretation," *72nd Ann. Internat. Mtg: Soc. of Expl. Geophys.*, pp. 684-687.

Specht, D.F. (1990) "Probabilistic Neural Networks," *Neural Networks*, 3, pp. 109-118.

Suslick, S. B. et al. (2004) "Risk Analysis Applied to Petroleum Exploration and Production: An Overview," *Jrnl. Petroleum Science and Engineering*, 44.1-2, pp. 1-9.

VanTrees, H. L. (1968), *Detection, Estimation, and Modulation Theory*, Wiley, pp. 36-46.

EP Search Report #RS 112602US dated Oct. 3, 2005, 2 pages.

PCT International Search & Written Opinion, dtd Sep. 14, 2006, 5 pgs.

\* cited by examiner

DESIGN OF RECONNAISSANCE SURVEYS USING CONTROLLED SOURCE ELECTROMAGNETIC FIELDS VIA PROBABILISTIC NEURAL NETWORK

This application claims the benefit of U.S. Provisional Patent Application No. 60/675,045 filed on Apr. 26, 2005.

FIELD OF THE INVENTION

This invention relates generally to the field of geophysical prospecting, and more particularly to the field of controlled-source electromagnetic ("CSEM") surveying. Specifically, the invention is a method for designing a reconnaissance survey for CSEM exploration of a subterranean region, and interpreting the results.

BACKGROUND OF THE INVENTION

Because reconnaissance CSEM surveys must be designed in the absence of any information about specific targets, that being what is meant by the term "reconnaissance," methods used for designing traditional target-oriented CSEM surveys are inapplicable. In addition, because the interpretational objectives and prior information are different from target-oriented CSEM surveys, a different interpretation approach is needed.

Target-oriented CSEM surveys are currently directed towards one or more specific targets that have been identified and characterized using prior information, such as 3D seismic data. Design and interpretation of these surveys is guided by this prior information (Kong et al., "Seabed logging: A possible direct hydrocarbon indicator for deepsea prospects using EM energy, *Oil and Gas Journal*, 30-38 (May 13, 2002)). In reconnaissance CSEM surveying, the specific target parameters may not be available and usually only general geological information is known. The few attempts at designing reconnaissance CSEM surveys concentrated on improving resolution and accuracy. See Maurer et al., "Optimized and robust experimental design: a non-linear application to EM sounding," *Geoph. J. Int.* 132, 458-468 (1998); and Singh et al., "Effective skin depth with a local source and its application to survey design and data interpretation," *72nd Ann. Internat. Mtg: Soc. of Expl. Geophys.*, 684-687 (2002). The equipment vendors offer cheaper tools to cover large areas (usually in regular grid) at reduced costs. See Eaton et al., "NEWTEM—A novel time-domain helicopter electromagnetic system for resistivity mapping," *72nd Ann. Internat. Mtg: Soc. of Expl. Geophys.*, 1-4 (2002). Other writers suggested an approach to survey design based on global minimization where the objective function includes the measure of optimal resolution and penalizes the survey cost through the number of required measurements (Maurer et al., "Geophysical survey design: Get the most for the least!" *68th Ann. Internat. Mtg: Soc. of Expl. Geophys.*, 78-81 (1998)). There is a need for a method that can evaluate a proposed reconnaissance survey of a particular design, and allow comparison of different survey designs on an expected value basis. The present invention satisfies this need.

SUMMARY OF THE INVENTION

In one embodiment, the present invention is a method for evaluating a proposed design for a geophysical survey of a subsurface region, comprising the steps of (a) obtaining existing geologic and economic information about the subsurface region and about potential target formations therein; (b) simulating a plurality of calibration surveys of the subsurface region, using the existing geologic information and the proposed survey design, each simulated survey assuming target properties consistent with the existing information but otherwise random; (c) using the simulated calibration survey results and the existing economic information to train a selected classifier algorithm to convert the results of a survey into an indicator of presence of economic size targets; (d) simulating a plurality of decision surveys of the subsurface region, using the existing geologic information and the proposed survey design, each simulated survey assuming target properties consistent with the existing information but otherwise random; (e) applying the trained classifier to the results of each of the plurality of simulated decision surveys, generating an indicator of likelihood that such survey contains at least one economic target; (f) selecting a threshold value for the target indicator based on a count of correct indications of at least one economic target and a count of incorrect indications of at least one economic target from said plurality of simulated decision surveys; and (g) calculating an expected value for a geophysical survey based on the proposed survey design, using probabilities derived from said count of correct indications and said count of incorrect indications corresponding to the selected threshold indicator value.

In some embodiments of the invention, the geophysical survey is a controlled source electromagnetic survey, and the simulating steps comprise: (a) converting said existing geologic information into a set of target property probability distributions, including a distribution of the number of targets in the subterranean region; (b) randomly drawing a set of target properties from said target property distributions; (c) placing a target at a random location in the subterranean region; (d) repeating steps (b)-(c) until the drawn number of targets have been placed; (e) solving Maxwell's field equations to develop a sensitivity map database, each map giving an anomalous electromagnetic response at a central receiver location for a representative array of nearby target positions thereby showing receiver sensitivity to relative target position, said database comprising a map for each of a representative set of target properties and for source properties including at least one source frequency from the proposed survey design; (f) selecting at least one sensitivity map matching the target properties of one target placed in the subterranean location in a previous step; (g) extracting the electromagnetic response from the selected sensitivity map, or interpolating from two maps, for a plurality of relative target-to-receiver locations; and (h) repeating steps (f)-(g) for each additional target placed in the subterranean location, thereby generating a map database of simulated anomalous electromagnetic responses observed at each receiver due to all placed targets.

The trained classifier of the present invention may also be used to evaluate the results of an actual survey.

BRIEF DESCRIPTION OF THE DRAWINGS

The present invention and its advantages will be better understood by referring to the following detailed description and the attached drawings in which:

FIGS. 4*a*-4*c* illustrate electromagnetic modeling for sensitivity maps.

The invention will be described in connection with its preferred embodiments. However, to the extent that the following detailed description is specific to a particular embodiment or a particular use of the invention, this is intended to be illustrative only, and is not to be construed as limiting the scope of the invention. On the contrary, it is intended to cover all alternatives, modifications and equivalents that may be included within the spirit and scope of the invention, as defined by the appended claims.

DETAILED DESCRIPTION OF THE PREFERRED EMBODIMENTS

The invention applies a technique called Value of Information ("VOI") analysis (see chapter 10 in Newendorp, *Decision Analysis for Petroleum Exploration*, PennWell Publishing (1975)) to CSEM survey design. The inputs are a set of candidate survey designs, and general geologic information about the electromagnetic targets that might be present in the survey area. Some of these targets might represent economic accumulations of hydrocarbons, while others are too small to be economic, even if they contain hydrocarbons. The basic output is an economic value for each survey design that depends on its ability to distinguish between economic and uneconomic targets. The survey design that delivers the highest value, after accounting for the survey cost, is the one that should be used.

The objective of a reconnaissance CSEM survey is to decide whether further, higher cost exploration activities, such as acquiring 3D seismic data, should be pursued in the survey area. If the outcome of the reconnaissance survey is sufficiently favorable for the presence of an economically viable hydrocarbon accumulation, additional data gathering and analysis is justified. According to VOI principles, a survey design should be selected based on its ability to reduce the uncertainty in this decision.

Figure 1:
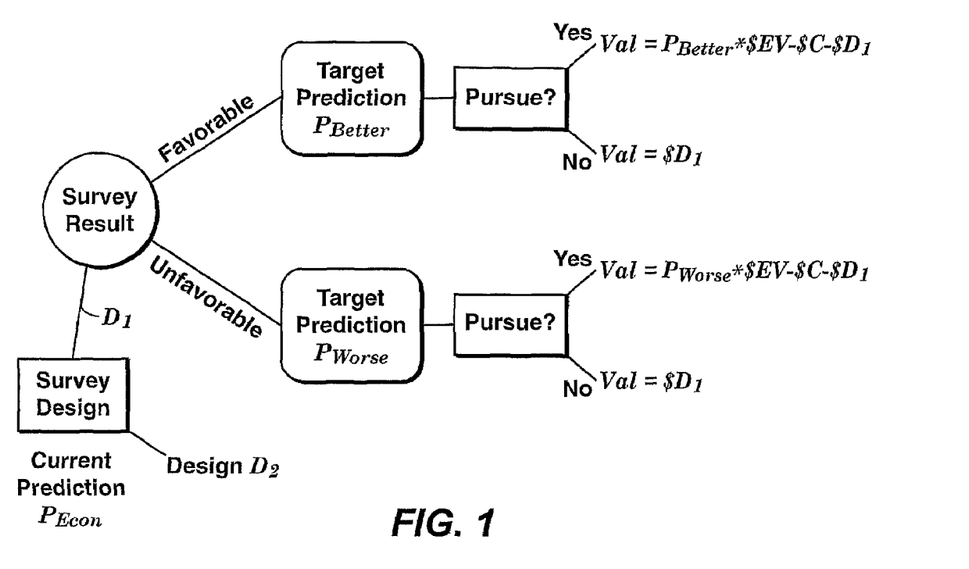
FIG. 1 is a decision tree for Value of Information analysis of survey designs.

FIG. 1 shows a VOI decision tree for the survey design problem. The rectangles in FIG. 1 represent decisions. The process begins at the left side of the tree, trying to decide between competing survey designs $D_1$ and $D_2$. (The branch for design $D_2$ looks the same as the $D_1$ branch, so it is not shown in the figure.) For simplicity, only two designs are shown in the tree, but the analysis applies to any number of candidate designs. Typically, there are only a limited number of operationally practical designs that need to be considered.

Based on the general geologic information that is currently available, the survey area is assigned a probability $P_{ECON}$ of containing an economic-size target. The fact that a reconnaissance survey is under consideration implies that $P_{ECON}$ is low, so the decision about whether to pursue exploration in the survey area is risky. The results of the survey can reduce the risk either by increasing $P_{ECON}$, making it more likely that subsequent information will find an economic hydrocarbon accumulation, or by decreasing $P_{ECON}$, making it less likely that a viable prospect is being abandoned.

The results of a reconnaissance CSEM survey depend on the survey design and on the unknown distribution of targets in the survey area. For simplicity, the range of possible results is represented as two branches in FIG. 1—a "Favorable" outcome that results in higher probability of an economic target $P_{BETTER}$, and an "Unfavorable" outcome that results in a lower probability $P_{WORSE}$. Because the actual outcome is unknown, both possibilities have to be considered. If the result is the favorable outcome, the user of the method will decide whether to pursue exploration based on the new, higher probability $P_{BETTER}$. If $P_{BETTER}$ is high enough, the user will decide to pursue exploration, and the expected economic value of the survey area will be $P_{BETTER}*\$EV-\$C$, where $\$EV$ is the expected NPV of a successful exploration effort, and $\$C$ is the cost of the next step in the exploration process. If the user gets an unfavorable outcome, $P_{WORSE}$ might be low enough to cause him to decide to abandon the area, so its value will be zero. In either case, the user has spent the cost of carrying out survey design $D_1$, $\$D_1$. The value of design $D_1$ is the sum of the values shown on FIG. 1 at the ends of the two "Survey Result" branches (the "yes" fork at the end of each branch), weighted by the probability of getting that result. The present invention provides a method for predicting those two probabilities, called $P_{Favorable}$ and $1-P_{Favorable}$ hereinafter. A similar process gives the value for design $D_2$.

Implementing the VOI analysis depicted in FIG. 1 is not straightforward because the user of the invention will rarely know the probabilities required to evaluate the tree. It will usually be possible to make a geologic estimate of $P_{ECON}$, but it is not clear how to estimate the post-survey probabilities $P_{BETTER}$ and $P_{WORSE}$. Common practice in other petroleum upstream areas is to estimate the required probabilities based on expert opinion. See Coopersmith et al., "A practical approach to evaluating the value of information and real option decisions in the upstream petroleum industry," Society of Petroleum Engineers (SPE) Paper 77582 (2002). However, since reconnaissance CSEM surveying is a new technology, there is not enough of an experience base for this approach to be feasible. The present invention circumvents this difficulty by replacing the decision tree branches for each survey design with a probabilistic modeling procedure that computes post-survey value directly, based on available geologic and economic information. Then, the best survey design can be selected using the standard VOI criterion—the design that produces the highest expected value (Val) for the survey area.

Figure 2:
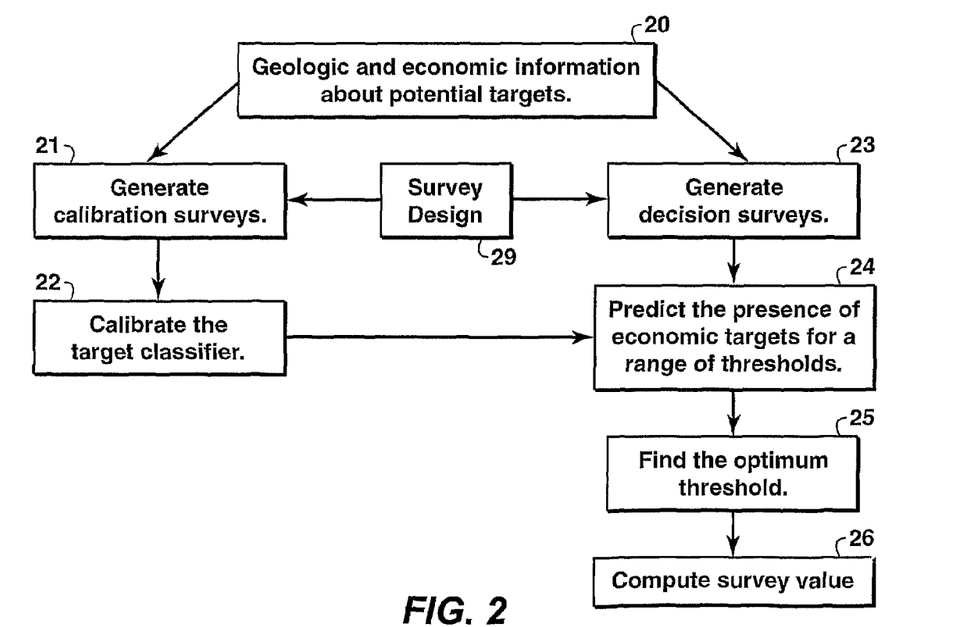
FIG. 2 is a flow chart of the basic steps of one embodiment of the invention.

FIG. 2 shows the basic steps used in estimating the economic value of a survey design. Details of these steps are provided below, with the understanding that the details may pertain only to particular embodiments of the invention where specific examples are useful for illustrative purposes. The inputs 20 are general information about the survey area, and the survey design parameters 29. The output is the result of step 26, the value associated with the survey design.

At step 21, a set of simulated surveys is generated where the target properties match those expected (from the input information 20) for the survey area, but are otherwise random. The surveys generated in step 21 are used in step 22 as a training data set for a pattern recognition algorithm that converts the observations made in the survey into indicators of the presence of economic-size targets. Step 24 applies the classifier trained in step 22 to a second set of simulated surveys generated in step 23, resulting in a set of maps that indicate the likelihood of having an economic target within each simulated survey area. Step 25 determines the threshold value for the target indicator that optimizes the performance of the survey, over the set of simulations. The result of step 25 is a pair of probabilities, "detection probability and "false positive" probability, that are used in step 26 to calculate survey value.

Figure 3:
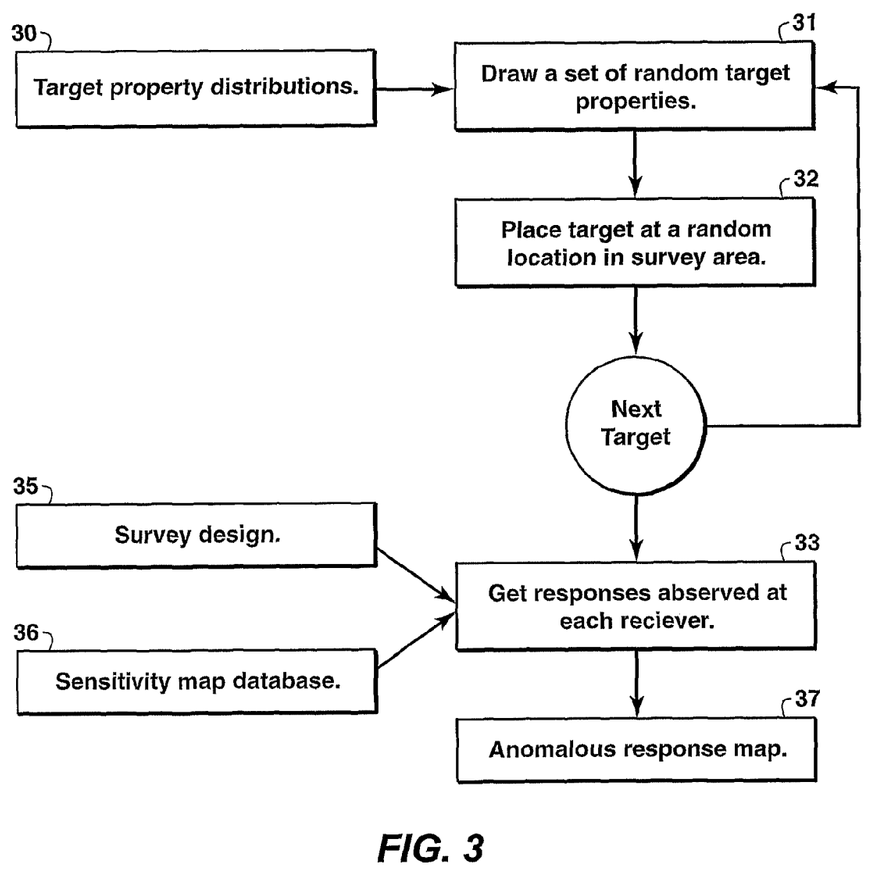
FIG. 3 is a flow chart showing the basic steps in a survey simulation.

FIG. 3 shows the steps used in generating a simulated CSEM survey. The procedure in FIG. 3 is used to generate the two sets of surveys in steps 21 and 22 of FIG. 2. At step 31 in FIG. 3, a random realization of target parameters is drawn from a set of probability distributions 30 that have been constructed from the prior, non-target-specific, geologic information 21. Target parameters include target dimensions, orientation, depth, and resistivity. Step 32 places each target at a random location in the survey area. In the case of a target's (x,y) coordinates, the probability distribution that is randomly sampled is typically a uniform distribution. Steps 31 and 32 are repeated until the survey area is fully populated with targets (based on the random sampling of the probability distribution for number of targets). Depending on the input distributions, simulated survey areas may or may not contain economic targets, and may or may not contain the same number of targets.

Step 33 determines the anomalous EM responses that would be observed at each receiver in the survey, for the set of simulated targets. For realistic survey designs, multiple observations would be made at each receiver. Separate observations would result from different transmitter frequencies, from different line orientations and offset distances. Because a large number of surveys must be simulated to get statistically significant probability estimates, full electromagnetic modeling of the responses is impractical. Instead, a database 36 of precomputed "sensitivity maps" is used to derive the anomalous responses for each survey design 35 proposed. Because the database contains maps for a finite number of discrete models, no map will exactly match the parameters of the randomly generated target. Consequently, step 33 either selects the "closest" map (based on an appropriate distance measure in parameter space), or interpolates a map for the required target parameters from a set of nearby maps. Further at step 33, the anomalous response at each receiver for the given target location is picked off the sensitivity map just selected for that receiver, and that value is stored on a map 37 of receiver locations called an anomalous response map.

Figure 4A:
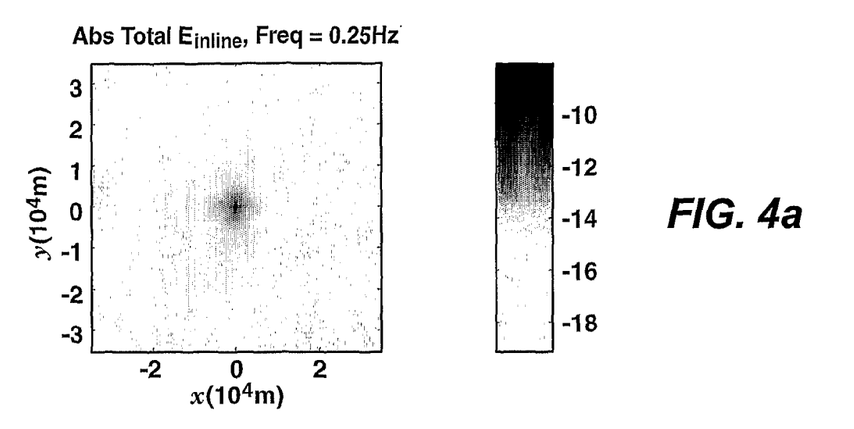
FIG. 4*a* shows the modeled field with target present.
Figure 4B:
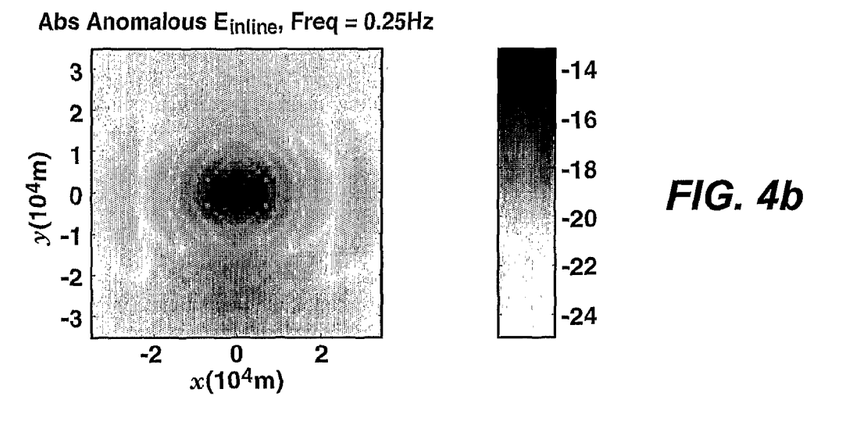
FIG. 4b shows the anomalous field.
Figure 4C:
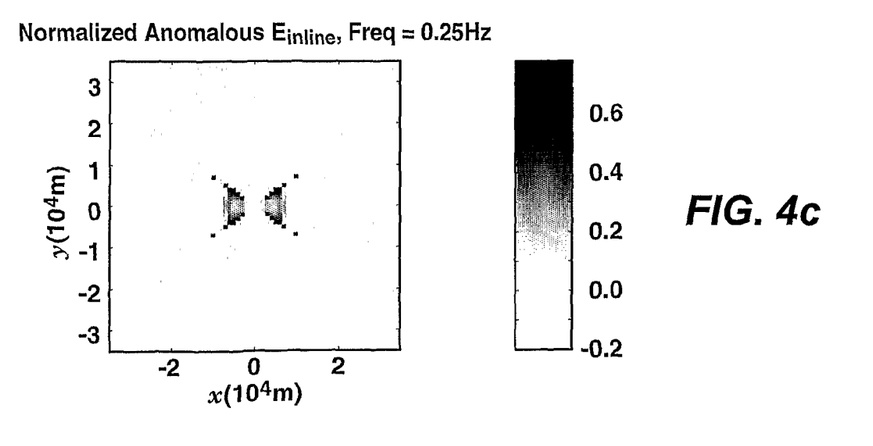
FIG. 4c shows the anomalous field expressed as a fraction of the peak field.

The sensitivity maps 36 are generated using the following procedure. First, a simplified numerical model of the resistivity distribution within the medium without targets is built. Targets are modeled for a range of sizes (both economic and uneconomic), resistivities, and depths. A range of transmitter and receiver locations is simulated as well. FIG. 4 shows the modeling that is done for each target. The electromagnetic field at the receiver is simulated using three-dimensional modeling software with and without resistive target. FIG. 4a shows the modeled field with the target present. FIG. 4b shows the "anomalous" field—the difference between the modeled field with and without the target. FIG. 4c shows the anomalous field, expressed as a fraction of the peak field. The modeling shown in FIG. 4 is repeated for all possible relative locations of the target and the transmitter, out to a distance where the anomalous response becomes negligible. FIGS. 4a-c show modeled results for a source frequency of ¼ Hz, but in practice similar figures would be generated for all significant frequencies in the source frequency spectrum. The maximum value of the normalized anomalous response (from FIG. 4c) for each modeled target-transmitter displacement is posted on a map, resulting in a "sensitivity map" like that shown in FIG. 5. Sensitivity maps are target- and transmitter-specific; a different map must be modeled for each transmitter frequency and for each possible offset between the transmitter array (which is represented by a line in the example on FIG. 5) and the target. Enough sensitivity maps must be generated to populate a database that covers the range of target and transmitter characteristics needed to evaluate the candidate surveys.

Figure 5A:
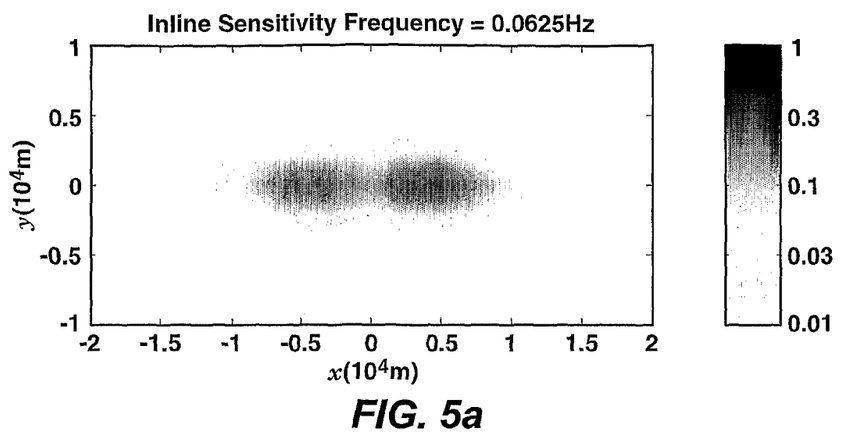
FIGS. 5a-c are sensitivity maps for source frequencies of 0.0625 Hz (FIG. 5a), 0.125 Hz (FIG. 5b), and 0.25 Hz (FIG. 5c)
Figure 5B:
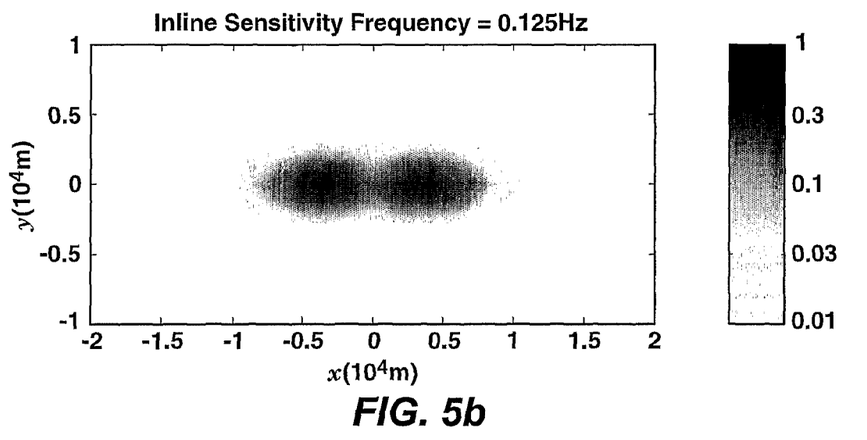
Figure 5C:
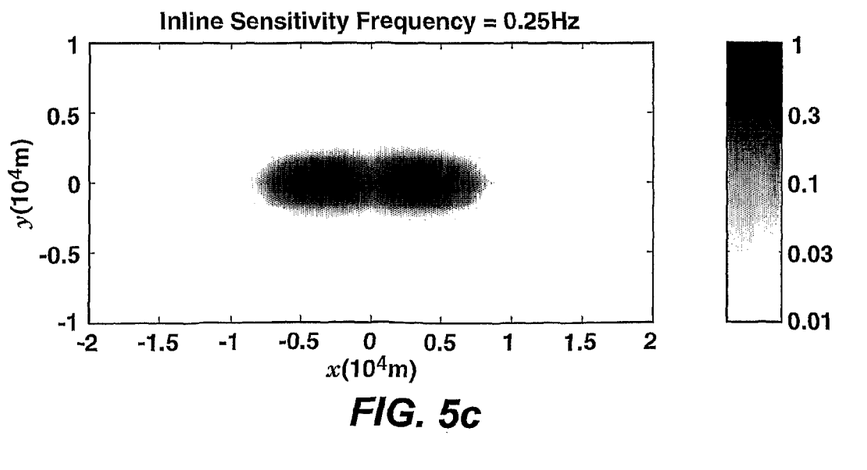

Explaining in more detail, FIG. 4a shows (using the gray scale indicated in the figure to show the power of ten) the inline component of the electric field (this was the selected EM field parameter in this instance) measured at a receiver located at coordinates (0,0,0), where z=0 is the water bottom. The gray scale is logarithmic ranging from $1 \times 10^{-18}$ to $1 \times 10^{-10}$, and similarly for FIGS. 4b and 5a-c. In actual practice, a color scale would be preferred by most users over the gray scale used in this patent document, and therefore the term "color" scale will be used herein below. The axes in FIGS. 4a-c represent the lateral (x,y) position of the source, in tens of kilometers. FIGS. 4a-c are modeled with a target located at (0,0,1250), i.e., 1250 m below the water bottom, but other FIGS. 4a-c would be generated for all possible target positions in discrete 3D space, or as many of them as the user wants to sample. The user selects the cell size in discrete 3D space, balancing the need for precision with the need for computational efficiency. The source in these model calculations is assumed to be an electric bipole of length 100 m, aligned with the inline (x) direction. FIG. 4b shows the absolute value of the location-by-location difference between the field value from FIG. 4a and the (not shown) background field, i.e., the value of the inline component of E with no target at (0,0,1250) or anywhere else in the model. For a target such as the one assumed for FIGS. 4a-c, a plot of the background field would be virtually indistinguishable from FIG. 4a to the unaided eye. (Of course, the present invention will be typically practiced with the aid of a digital computer, and displays such as FIG. 4a, while useful for understanding the invention, are not used to make color judgments for subtraction to yield FIG. 4b.) Thus, the anomalous field represented by FIG. 4b is relatively very small, as can be seen by the different numbers on the color scale compared to FIG. 4a. (By definition, any response different from the expected response for no targets, i.e., the background, is considered "anomalous.") FIG. 4c shows the normalized anomalous field, i.e., the location-by-location ratio of the value (on the color scale) from FIG. 4b divided by the value of the background field (not shown). All values on FIG. 4c are fractions ≦1 as indicated on the color scale which, unlike that of FIG. 4a or 4b, is a linear scale. (No fraction will be negative; the negative values on the color scale for the darkest blues are merely to shift the plotted colors into a more readily contrasting part of the color bar.) For the particular parameters of FIG. 4c, most of the drawing shows values of zero or slightly less indicating very little impact by the target on the $E_{inline}$ value for all source positions except near (0,0). It should be understood that for different targets at different locations, e.g., larger, more resistive targets located closer to the receiver, FIG. 4c might look quite different.

Where FIGS. 4a-c show sensitivity of a particular receiver to source position, FIGS. 5a-c show sensitivity to target position. Once again, the receiver is fixed at (0,0,0) and source frequency, target size, target resistivity, and target depth are the same as for FIGS. 4a-c. Position on FIGS. 5a-c means lateral position of the target, not the source. To obtain a value to plot (actually, to store in a computer database) at a certain location on FIG. 5c (which corresponds to the same 0.25 Hz frequency as FIG. 4c), one looks (in this particular embodiment of the invention) to the particular FIG. 4c that corresponds to the target in the aforesaid certain location, and picks the maximum value (on the color scale) anywhere in that FIG. 4c, i.e., regardless of source position. The reason for this is to emphasize as much as possible what is likely a small effect. The impact of the target on what is detected by a receiver will typically be small, and the maximum impact will not occur at the same relative source position for different relative positions of receiver and target. Selecting the maximum value of the normalized anomalous field regardless of source position is thus considered a preferred embodiment of the invention, but it is obviously not the only possible way of performing this step of the invention. All values in FIGS. 5a-c are within the range of 0 to 1, but to provide more contrast at the low end of that range, the numbers on the color scale are exponent values, i.e., the scale runs from 0.01 to 1. The target size (lateral dimensions) is indicated by the rectangle in the upper right portion of each drawing (an arbitrary position since the target assumes every position in FIGS. 5a-c).

Figure 6:
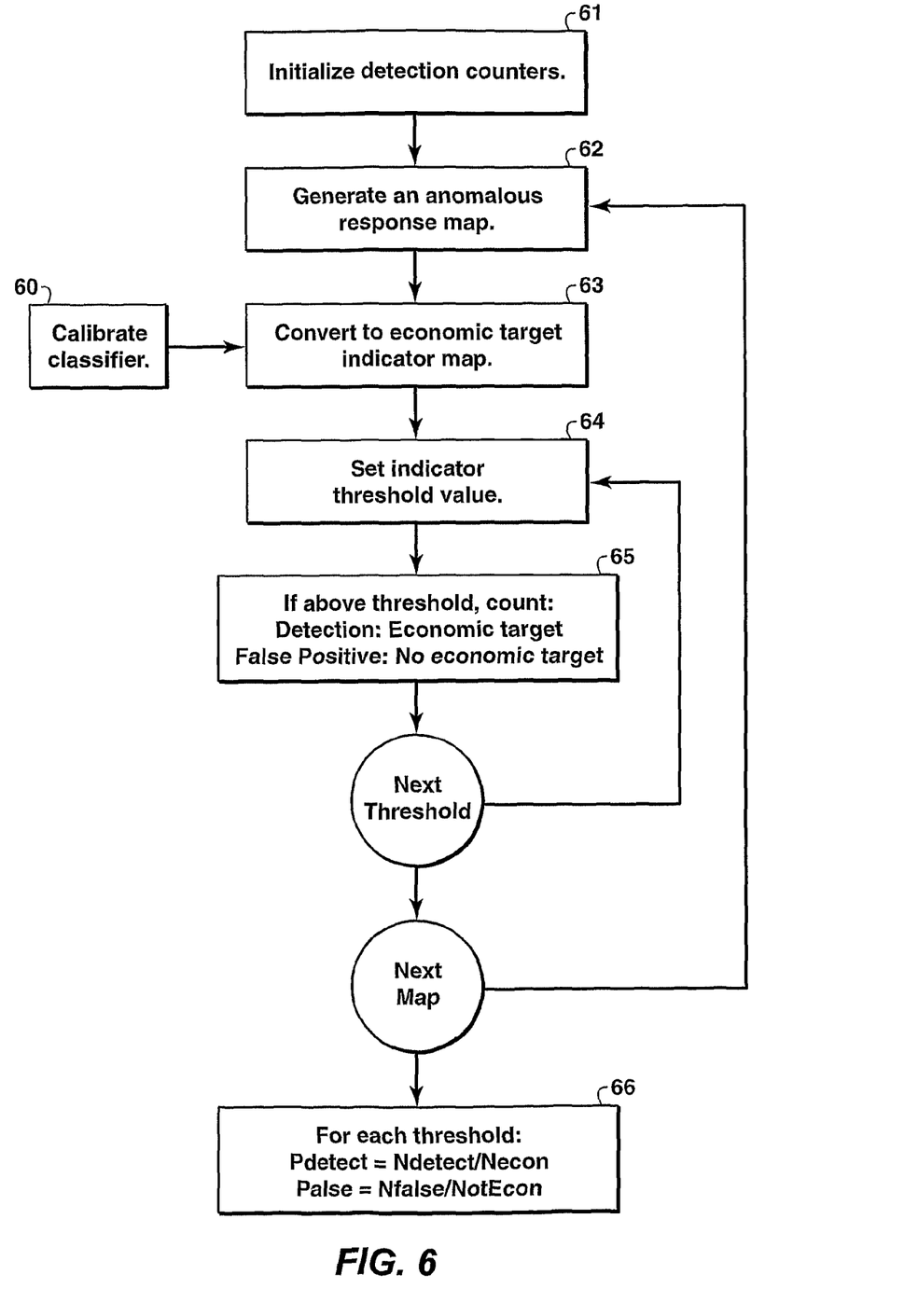
FIG. 6 is a flow chart showing steps for detecting economic-size targets.

FIG. 6 shows the process used in one embodiment of the invention to predict the presence of economic-size targets from the simulated anomalous response maps. FIG. 6 shows steps 23 and 24 of FIG. 2 in more detail. At step 61, a set of counters is initialized for use to tally successful detections of economic targets and false identifications of non-economic targets as economic, for a range of assumed detection thresholds. At the end of the process (step 66), the contents of these two arrays of counters are used to compute the set of probabilities that characterize the performance of this survey design.

At step 62 of FIG. 6, a loop is started to generate each map in the "decision" set of step 23 in FIG. 2. The procedure shown in FIG. 3 is used in step 62 to generate an anomalous response map for each simulated survey. At step 63, a pattern recognition algorithm 60 trained on a previously generated set of "calibration" surveys (steps 21 and 22 in FIG. 2) is used to convert the multiple observations made at each receiver on the simulated map from step 62 into a number whose value is an indicator of the presence or absence of an economic-size target near the receiver. In a preferred embodiment of the invention, a probabilistic neural net (Specht, "Probabilistic neural networks," *Neural Networks* 3, 109-118 (1990)) is used as the detection algorithm, but any other suitable pattern recognition algorithm (e.g., Tou et al., *Pattern Recognition Principles*, Addison-Welsey (1974)) may be used. The output of step 63 is a map of the probability of having an economic-size target within a user-defined region, called the "detection region", around each receiver. In the subsequent discussion, the term "probability" will be used with the understanding that, if a different pattern recognition algorithm is used, it might refer to some other indicator of the presence of a target.

Because the mapped probabilities will normally not be zero or one, the presence of an economic-size target is still uncertain. To decide whether an economic target has been detected, it is necessary to set a threshold probability, above which the user will declare that a target is present. Because of the uncertainty involved, any threshold chosen will result in some errors. Either one will fail to detect all the economic-size targets that are present, or one will falsely classify some non-economic targets as economic. The loop shown on FIG. 6 that repeats steps 64 and 65 quantifies these two types of errors for a range of assumed detection thresholds.

At step 64, a value is set for the detection threshold. If the classifier 60 outputs probabilities, the thresholds range from zero to one, typically incremented in equal steps. At step 65, the known locations of economic-size targets are used to determine if the assumed threshold has produced a valid detection or a false positive. In one embodiment of the invention, the detection criterion is based on the entire survey area. If any receiver has an above-threshold probability and an economic-size target is present anywhere in the survey area, a valid detection is counted by incrementing the element of the detection counter array that corresponds to the current threshold. If any receiver has an above-threshold probability and no economic-size targets are present anywhere in the survey area, a false positive is counted by incrementing the appropriate element of the "false positive" counter array. Depending on the application, it may be preferable to use a more localized detection criterion that considers the relative locations of the targets and the above-threshold receivers.

After all thresholds have been evaluated, steps 62 through 65 are repeated until detections and false positives have been counted for all maps in the "decision" set. At step 66, the two sets of counts are converted into detection probabilities and false positive probabilities by dividing the detection count by the total number of simulated surveys that contain economic-size targets (Necon), and by dividing the false positive count by the total number of simulated surveys that do not contain economic-size targets (NotEcon). The curve that results when detection probability is plotted as a function of false positive probability for the various threshold values may be called a ROC (Receiver Output Characteristic) curve. It fully characterizes the ability of the survey design to distinguish between economic-size and sub-economic targets under the modeled geological circumstances (VanTrees, *Detection, Estimation, and Modulation Theory*, Wiley (1968)). For each probability pair, Bayes's Rule (see VanTrees) may be used to compute the probabilities needed to evaluate the decision tree in FIG. 1, and to compute an economic value for the survey area:

$$P_{Favorable} = P_{ECON} * P_{detect}(\text{thresh}) + (1 - P_{ECON}) * P_{false}(\text{thresh}) \quad (1)$$

$$P_{BETTER} = P_{ECON} * P_{detect}(\text{thresh}) / P_{Favorable} \quad (2)$$

$$\text{Value}_{BETTER} = \$EV * P_{BETTER} - \$C \quad (3)$$

$$P_{WORSE} = P_{ECON} * (1 - P_{detect}(\text{thresh})) / (1 - P_{Favorable}) \quad (4)$$

$$\text{Value}_{WORSE} = \$EV * P_{WORSE} - \$C \quad (5)$$

$$\text{Value} = P_{Favorable} * \text{MAX}(0, \text{Value}_{BETTER}) + (1 - P_{Favorable}) * \text{MAX}(0, \text{Value}_{WORSE}) \quad (6)$$

where $P_{ECON}$, \$EV and \$C are as defined for FIG. 1. The threshold Tmax that produces the maximum value (Eq. 6) is the detection threshold that should be used if one wants to maximize the value of the survey area (but, as the example that follows shows, the user may not necessarily want to use this particular threshold). The economic value computed for Tmax is the value associated with the survey design, and is equivalent to the probability-weighted sum of the values of the decision tree branches in FIG. 1. Note that step 63 in FIG. 6 could also be used to get a target probability map from observations recorded on a real survey. Combined with the detection threshold value determined from the simulated "decision" surveys, this is a quick way to get a preliminary interpretation of real data.

Example

This section presents an example of applying the survey design procedure. Table 1 lists the target parameters used in the example. These contain information about the properties of the targets that are expected in the survey area, but do not contain information about any specific target. In a real case, these parameters would be derived from general geologic information about the survey area. For this example, the probability that the survey area has at least one economic target is ¼. If the target set is one of the 25% that has at least one economic target, then the number of economic targets it will have is either 1 or 2, with each possibility equally probable. The total number of targets in the survey area must be either 3, 4 or 5 (whether or not any are economic), with each possibility assigned equal probability. The target parameter distributions listed in Table 1 in terms of a minimum value, a maximum value, and a most probable value, are for purposes of this example assumed to have triangular shapes. Table 2 lists the properties of the targets contained in the sensitivity map database 36 (FIG. 3) that has been used for this example.

TABLE 1

Target Property Probabilities for Simulation Example

| P (Economic) = 0.25 | Min | Max |
|---|---|---|
| No. of Targets | 3 | 5 |
| No. of Economic Targets | 1 | 2 |

| | Min | Most Likely | Max |
|---|---|---|---|
| Area (km$^2$) | 5 | 15 | 25 |
| Aspect Ratio | 1 | 3 | 7 |
| Strike (deg) | 0 | 90 | 180 |
| Thickness (m) | 25 | 50 | 110 |
| Depth (m) | 500 | 1500 | 2500 |
| Resistivity (ohm-m) | 20 | 70 | 120 |

TABLE 2

Sensitivity Map Database

| Length (m) | Width (m) | Thickness (m) | Depth (m) | Orientation (deg) | Resistivity (ohm-m) |
|---|---|---|---|---|---|
| 7000 | 1400 | 100 | 1000 | 0 | 100 |
| 7000 | 1400 | 100 | 1250 | 0 | 100 |
| 7000 | 1400 | 100 | 1500 | 0 | 100 |
| 7000 | 1400 | 100 | 1750 | 0 | 100 |
| 7000 | 1400 | 100 | 1000 | 45 | 100 |
| 7000 | 1400 | 100 | 1250 | 45 | 100 |
| 7000 | 1400 | 100 | 1500 | 45 | 100 |
| 7000 | 1400 | 100 | 1750 | 45 | 100 |
| 7000 | 1400 | 50 | 1000 | 0 | 40 |
| 7000 | 1400 | 50 | 1250 | 0 | 40 |
| 7000 | 1400 | 50 | 1500 | 0 | 40 |
| 7000 | 1400 | 50 | 1750 | 0 | 40 |
| 7000 | 1400 | 50 | 1000 | 45 | 40 |
| 7000 | 1400 | 50 | 1250 | 45 | 40 |
| 7000 | 1400 | 50 | 1500 | 45 | 40 |
| 7000 | 1400 | 50 | 1750 | 45 | 40 |
| 6000 | 3400 | 100 | 2000 | 0 | 100 |
| 6000 | 3400 | 100 | 2000 | 45 | 100 |
| 6000 | 3400 | 50 | 2000 | 0 | 40 |
| 6000 | 3400 | 50 | 2000 | 45 | 40 |

Following the steps of FIG. 3, a set of target properties is randomly drawn from the probability distributions in Table 1. This random drawing may be envisioned as a game of chance with a spinner at the center of a circular pie chart where the size of each section of the pie is proportional to its corresponding probability from Table 1. Next, the target with the closest properties is retrieved from the Table 2 database (step 33 of FIG. 3).

Figure 7A:
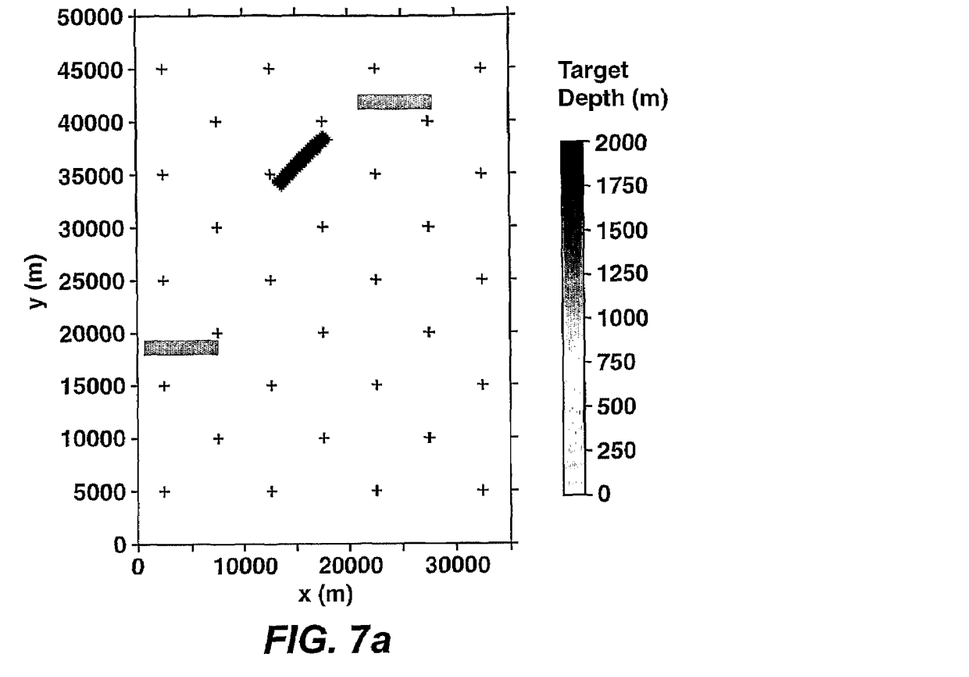
FIGS. 7a and 7b are location maps illustrating two simulated target steps.
Figure 7B:
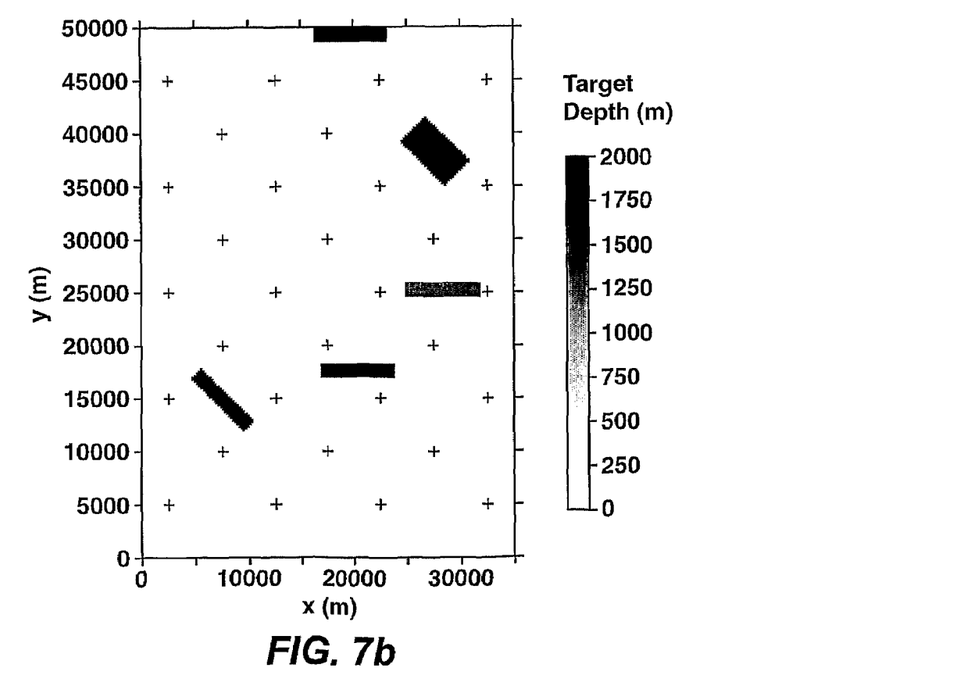

FIGS. 7a and 7b show examples of two survey areas that have been simulated based on Tables 1 and 2, following the procedure shown in FIG. 3. The simulated survey of FIG. 7b contains one economic-size target (the bigger rectangle); all others are non-economic. The aspect ratio is the length-to-width ratio of each target, assumed to be rectangular in their lateral cross section. The strike is the azimuth angle relative to North. The "+" symbols on the two maps indicate the locations of the 32 receivers in the first candidate survey design that will be considered. Transmitter lines (not shown on the maps) will run in the E-W direction, passing directly over the lines of receivers; there are 9 transmitter lines in this design. In this design, the receiver lines are too far apart for a transmitter passing over an adjacent receiver line to produce a response, so each receiver will record only the transmitter line that passes over it. The transmitter will radiate two frequencies: 0.065 and 0.25 Hz. Consequently, the survey design will result in two observations being recorded at each receiver.

Figure 8A:
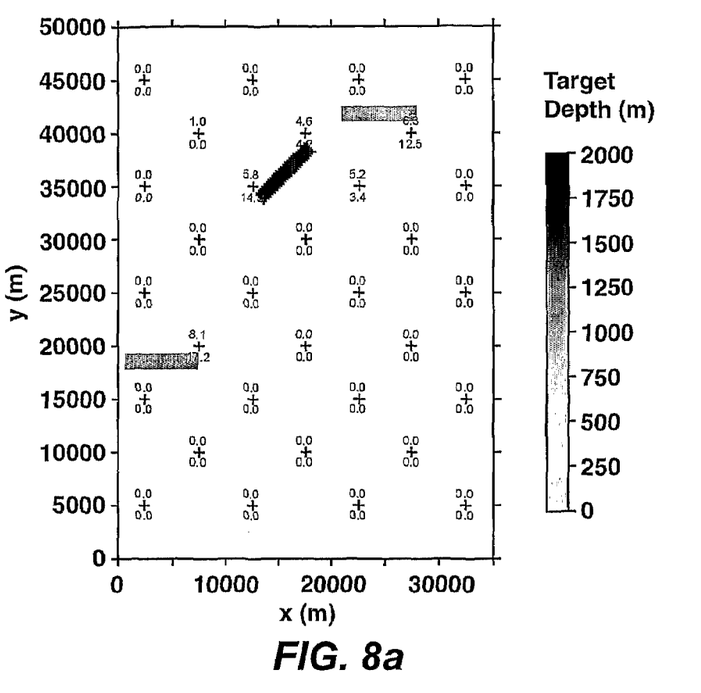
FIGS. 8a and 8b are anomalous response maps for simulated surveys with target locations given by FIGS. 7a and 7b, respectively.
Figure 8B:
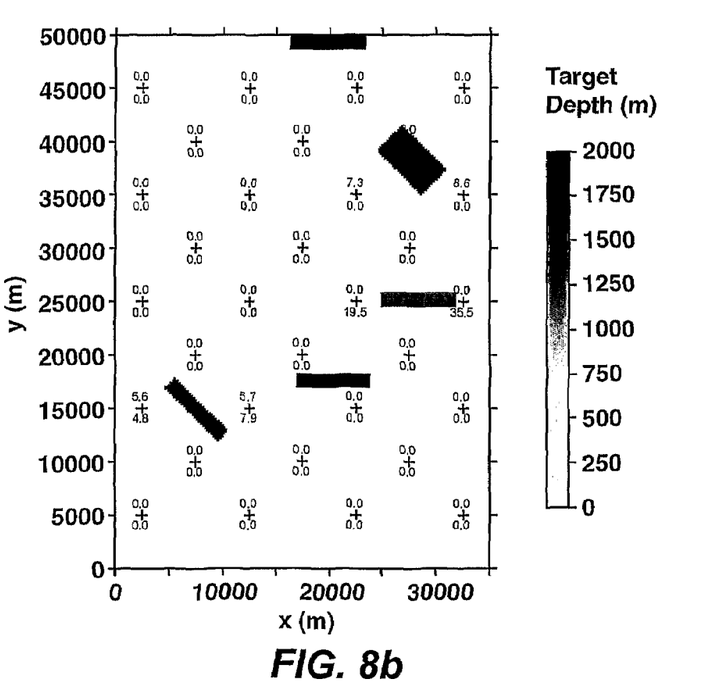

FIGS. 8a and 8b show the anomalous responses that would be recorded at each receiver location for the two simulated surveys. These maps are outputs from step 62 of FIG. 6, using the procedure illustrated in FIG. 3. The two values posted near each receiver are the anomalous responses observed at the two transmitter frequencies, and are obtained (step 33) from the sensitivity map database (36) for which Table 2 is the index for this particular example. For example, suppose a receiver location in FIG. 8a or 8b has a target whose center is 500 m west and 200 m north of the receiver. One looks at the corresponding map of the type illustrated by FIG. 5c (frequency 0.25 Hz) and finds the location (−0.5, 0.2) and notes that this falls in the yellow halo which is a value of approximately $10^{-0.75} \approx 0.18$ which would be expressed on FIG. 8a or 8b as a percent. So, the lower number (corresponding to 0.25 Hz) posted at that receiver location would be 18. If more than one target produces a response at a given receiver location, the largest response is recorded on the map. Most receivers are too far from targets to record an anomalous response. These pairs of observations were then (step 63 of FIG. 6) converted into single-value indicators of the presence of an economic-size target using a pattern classifier trained using the "calibration set" of simulated surveys (step 21 of FIG. 2).

Figure 9:
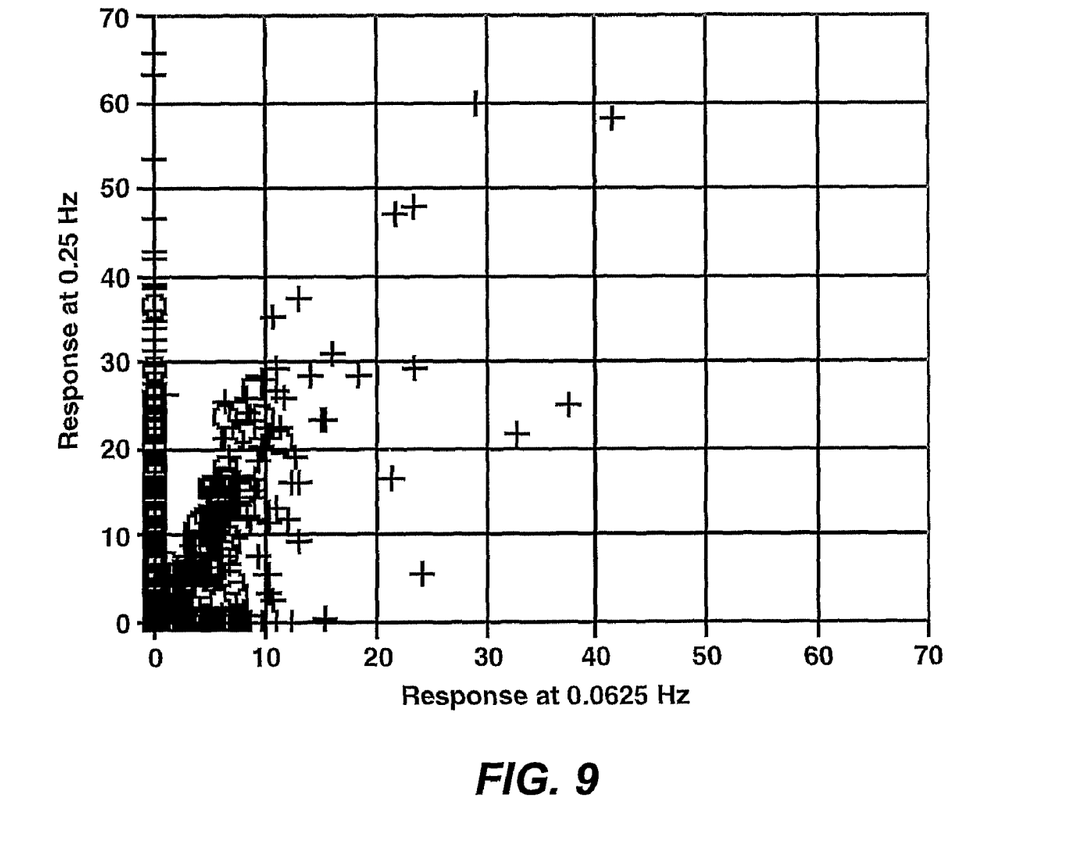
FIG. 9 illustrates economic and uneconomic responses from a calibration data set.

FIG. 9 illustrates how the training and operation of the pattern classifier is done in some embodiments of the invention. FIG. 9 shows a crossplot of 0.25 Hz vs. 0.0625 Hz responses from the calibration set (the output of step 21 of FIG. 2) for economic (+symbols) and uneconomic (circle symbols) targets. For any observed pair of responses from FIG. 8a or 8b, the calibrated classifier (from step 22 of FIG. 2, and step 60 of FIG. 6) computes a target probability (the single-value economic indicator) based on where the pair of responses falls relative to the two classes of calibration targets. FIG. 9 shows that, although economic targets tend to produce higher anomalous responses than uneconomic targets, there is much overlap between the two classes. For the survey design and targets that were simulated in this example, it will usually not be possible to unambiguously identify economic targets.

Figure 10A:
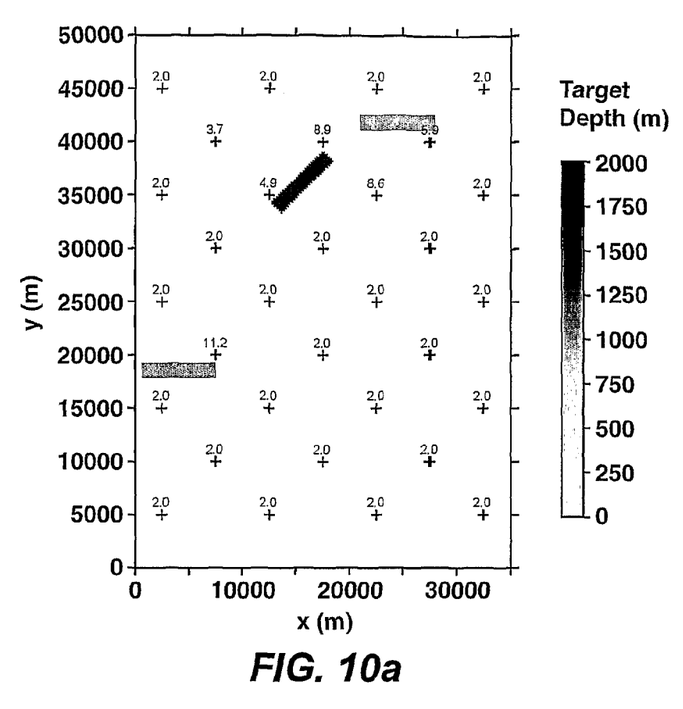
FIGS. 10a and 10b are maps showing economic target probabilities estimated from the anomalous responses of FIGS. 8a and 8b, respectively.
Figure 10B:
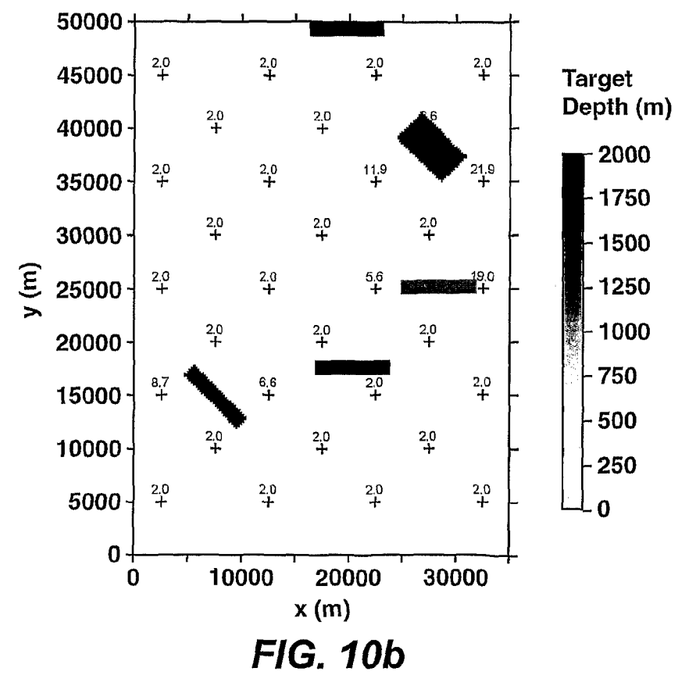

FIGS. 10a and 10b show the target probability maps derived from the responses in FIGS. 8a and 8b, respectively, using the classifier trained with the calibration data set in FIG. 9. The maps in FIGS. 10a and 10b are the output of step 63 in FIG. 6. The numbers in the target probability maps represent the probability, in percent, of having an economic size target within a 26 km×8 km rectangle centered on each receiver (+). The receivers that had no anomalous response (in FIG. 8a or 8b) have been assigned a small, (2%) probability of being near an economic target. This was done because it was noted from the calibration data set that a small number of economic-size targets in the calibration set of simulated surveys were positioned such that they produced no anomalous response. It was estimated that 2% of the receivers that had an economic target within their detection range produced a zero response. The 2% value will vary depending on survey design and target characteristics. So, in this way recognition may be taken that not only is the method unable to unambiguously identify all economic targets, it is also unable to eliminate the possibility of having an economic response, even if a zero value is recorded in the anomalous response map.

Because one cannot completely eliminate uncertainty in classifying targets based on the observed responses, the inventive method finds an optimum tradeoff between detecting economic-size targets and incorrectly classifying uneconomic targets as economic. This is the purpose of step 25 in FIG. 2, which (along with step 24) is done using the results of steps 64-66 in FIG. 6. This sequence of steps sets a series of assumed detection thresholds and, for each assumed threshold, counts the number of correct and incorrect classifications for all the simulated surveys in the "decision" set of step 23. The result is the "ROC" curve shown in FIG. 11. Each point on this curve comes from an assumed threshold value; low thresholds are in the upper right of the plot, and high thresholds are in the lower left. The points show the probability that an economic target will be detected with a given threshold value, versus the probability that an uneconomic target will incorrectly be classified as economic (a "false positive"). The survey design indicated by the diamonds in FIG. 11 is the "32 receivers" design of FIGS. 7*a-b*.

The ROC curve quantifies how different assumed thresholds affect the tradeoff between detections and false positives. This tradeoff, along with economic information about the decision that will be affected by the data, determines the information value associated with the survey design. The threshold that produces the highest information value is the one that is farthest from the line 110 which may be called the "NoInfo" line in FIG. 11. This is indicated by the large diamond 111 on the "32 Receivers" curve. (The "NoInfo" line represents a data set that has no ability to distinguish between economic and uneconomic targets.) The optimum threshold point 111 for the "32 Receivers" design gives a detection probability of about 50%, and a false positive probability of about 5%. If it is assume that the expected value of an economic-size target is $40M and the cost of pursuing exploration is $15M, equations (1-6) yield an information value of $5.3M for the "32 receivers" design.

Figure 11:
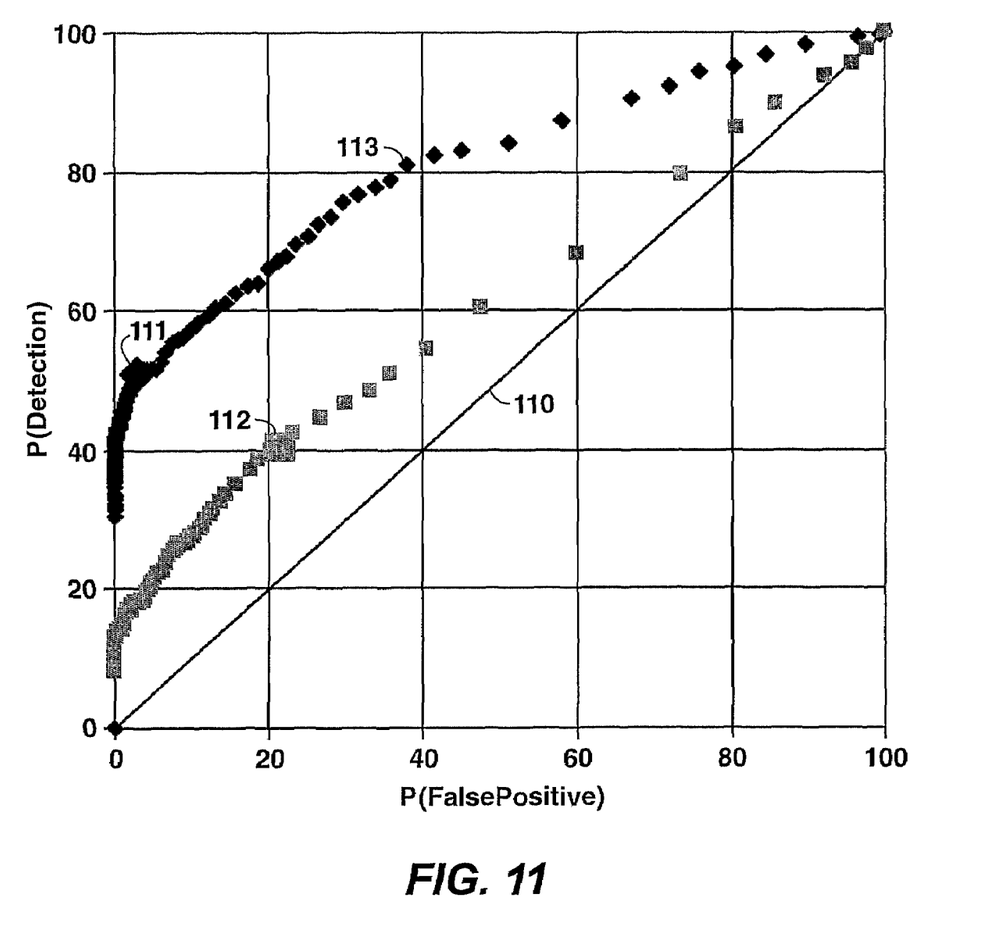
FIG. 11 shows receiver output characteristic ("ROC") curves for two survey designs.

The second ROC curve shown in FIG. 11 corresponds to a variation of this design where every other receiver and transmitter line is dropped, leaving 20 receivers and 5 transmitter lines. The cost of this survey design will be less than the higher-effort "32 receivers" design. However, its performance will also be inferior, as indicated by the "20 receivers" ROC curve in FIG. 11, where each plotted value is denoted by a square symbol. This design will always result in lower information value than the "32 Receivers" design because its ROC curve is always closer to the "NoInfo" line. The optimum threshold point 112 (the large square) gives a detection probability of about 40%, and a false positive probability of about 20%. Using the same economic parameters as above, this yields an information value of $2.1M. So, unless the "20 Receivers" design is more than $3.2M cheaper than the "32 Receivers" design, the "32 Receivers" design is preferred.

In the preceding example, a survey design is chosen using the detection threshold that produces the optimum value, but it is not necessary to do so. Often, there is a wide range of detection thresholds that all produce about the same information value. That this is the case for the "32 Receivers" design can be seen by rotating FIG. 11 until the "NoInfo" line is horizontal. This shows that there are many points to the right of the optimum point, corresponding to lower detection thresholds, that are all about the same distance from the "NoInfo" line. These points have different detection and false positive probabilities, but will all result in similar information value. For example, the point 113 with a detection probability of about 80%, and a false positive probability of about 40% yields a slightly lower information value ($4.6M), but depending on business objectives, one might be willing to give up some value to reduce the number of missed opportunities.

The foregoing description is directed to particular embodiments of the present invention for the purpose of illustrating it. It will be apparent, however, to one skilled in the art, that many modifications and variations to the embodiments described herein are possible. All such modifications and variations are intended to be within the scope of the present invention, as defined by the appended claims.

The invention claimed is:

1. A method for evaluating a proposed design for a geophysical survey of a subsurface region, comprising the steps of
    (a) obtaining existing geologic and economic information about the subsurface region and about potential target formations therein;
    (b) simulating a plurality of calibration surveys of the subsurface region, using the existing geologic information and the proposed survey design, each simulated survey assuming target properties consistent with the existing information but otherwise random;
    (c) using the simulated calibration survey results and the existing economic information to train a selected classifier algorithm to convert the results of a survey into an indicator of presence of economic size targets;
    (d) simulating a plurality of decision surveys of the subsurface region, using the existing geologic information and the proposed survey design, each simulated survey assuming target properties consistent with the existing information but otherwise random;
    (e) applying the trained classifier to the results of each of the plurality of simulated decision surveys, generating an indicator of likelihood that such survey contains at least one economic target;
    (f) selecting a threshold value for the target indicator based on a count of correct indications of at least one economic target and a count of incorrect indications of at least one economic target from said plurality of simulated decision surveys; and
    (g) calculating an expected value for a geophysical survey based on the proposed survey design, using probabilities derived from said count of correct indications and said count of incorrect indications corresponding to the selected threshold indicator value.

2. The method of claim 1, wherein said geophysical survey is a controlled source electromagnetic survey.

3. The method of claim 2, wherein said simulating steps comprise:
    (a) converting said existing geologic information into a set of target property probability distributions, including a distribution of the number of targets in the subterranean region;
    (b) randomly drawing a set of target properties from said target property distributions;
    (c) placing a target at a random location in the subterranean region;

(d) repeating steps (b)-(c) until the drawn number of targets have been placed;
(e) solving Maxwell's field equations to develop a sensitivity map database, each map giving an anomalous electromagnetic response at a central receiver location for a representative array of nearby target positions thereby showing receiver sensitivity to relative target position, said database comprising a map for each of a representative set of target properties and for source properties including at least one source frequency from the proposed survey design;
(f) selecting at least one sensitivity map matching the target properties of one target placed in the subterranean location in a previous step;
(g) extracting the electromagnetic response from the selected sensitivity map, or interpolating from two maps, for a plurality of relative target-to-receiver locations; and
(h) repeating steps (f)-(g) for each additional target placed in the subterranean location, thereby generating a map database of simulated anomalous electromagnetic responses observed at each receiver due to all placed targets.

4. The method of claim 3, wherein the anomalous electromagnetic response stored at each position in a sensitivity map is the largest anomalous response produced by any source position.

5. The method of claim 2, wherein said target properties include target dimensions, orientation, depth and resistivity.

6. The method of claim 2, wherein said classifier algorithm is pattern recognition software.

7. The method of claim 6, wherein the pattern recognition software is a probabilistic neural network.

8. The method of claim 2, wherein the results of each simulated survey include an anomalous response map database.

9. The method of claim 8, wherein anomalous response is a measure of electrical resistivity of a target formation relative to background resistivity in said subsurface region.

10. The method of claim 1, wherein said calculating an expected value step uses Value of Information theory.

11. The method of claim 10, wherein the two probabilities derived in the last step are the probability that, using a given target indicator threshold, a simulated survey containing at least one economic target is correctly identified as economic and the probability that a simulated survey containing no economic targets is wrongly identified as economic.

12. The method of claim 11, wherein Bayes's Rule is used to convert said two probabilities to probabilities needed to compute expected survey value from Value of Information theory.

13. The method of claim 1, wherein said economic indicator is a single number.

14. A method for evaluating the results of a geophysical survey of a subsurface region, comprising the steps of
(a) obtaining existing geologic and economic information about the subsurface region and about potential target formations therein;
(b) simulating a plurality of calibration surveys of the subsurface region, using the existing geologic information and the actual survey's design parameters, each simulated survey assuming target properties consistent with the existing information but otherwise random;
(c) using the simulated calibration survey results and the existing economic information to train a selected classifier algorithm to convert the results of a survey into an indicator of presence of economic size targets;
(d) applying the trained classifier to the results of the actual survey, generating an indicator of likelihood that such survey contains at least one economic target.

15. The method of claim 14, wherein said classifier algorithm is pattern recognition software.

16. The method of claim 15, wherein the pattern recognition software is a probabilistic neural network.

* * * * *